United States Patent
Meijer et al.

(10) Patent No.: US 9,567,489 B2
(45) Date of Patent: Feb. 14, 2017

(54) DRIER FOR AUTO-OXIDISABLE COATING COMPOSITIONS

(71) Applicant: AKZO NOBEL COATINGS INTERNATIONAL B.V., Arnhem (NL)

(72) Inventors: Michel Daniel Meijer, Leiden (NL); Eddy Van Weelde, Nieuw-Lekkerland (NL); Joseph Theodorus Maria Van Dijk, Leiden (NL); Jitte Flapper, Duivendrecht (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 14/365,193

(22) PCT Filed: Dec. 17, 2012

(86) PCT No.: PCT/EP2012/075681
§ 371 (c)(1),
(2) Date: Jun. 13, 2014

(87) PCT Pub. No.: WO2013/092441
PCT Pub. Date: Jun. 27, 2013

(65) Prior Publication Data
US 2014/0342163 A1 Nov. 20, 2014

(30) Foreign Application Priority Data
Dec. 20, 2011 (EP) ..................... 11194686

(51) Int. Cl.
*C09F 9/00* (2006.01)
*C08K 5/00* (2006.01)
*C08K 5/3467* (2006.01)
*C08K 13/02* (2006.01)
*C09D 167/08* (2006.01)

(52) U.S. Cl.
CPC ............ *C09F 9/00* (2013.01); *C08K 5/0091* (2013.01); *C08K 5/3467* (2013.01); *C08K 13/02* (2013.01); *C09D 167/08* (2013.01); *Y10T 428/31551* (2015.04); *Y10T 428/31786* (2015.04)

(58) Field of Classification Search
CPC ........ C09F 9/00; C09D 167/08; C08K 5/3467; C08K 5/0091; C08K 13/02
USPC .......................................................... 524/89
See application file for complete search history.

(56) References Cited

U.S. PATENT DOCUMENTS

| | | | |
|---|---|---|---|
| 3,988,273 A | 10/1976 | Tetsuo et al. | |
| 4,633,001 A | 12/1986 | Cells | |
| 4,824,611 A | 4/1989 | Cells | |
| 5,731,095 A | 3/1998 | Milco et al. | |
| 6,599,972 B2 | 7/2003 | Thames et al. | |
| 6,624,223 B1 | 9/2003 | Thames et al. | |
| 7,235,603 B2 | 6/2007 | Madle et al. | |
| 2009/0191412 A1 | 7/2009 | Van Benthem et al. | |
| 2009/0253833 A1 | 10/2009 | Hage et al. | |

FOREIGN PATENT DOCUMENTS

| | | |
|---|---|---|
| EP | 1 382 648 | 1/2004 |
| EP | 1 440 107 | 7/2004 |
| WO | 99/16810 | 4/1999 |
| WO | 03/037959 | 5/2003 |
| WO | 03/093384 | 11/2003 |
| WO | 2007/042684 | 4/2007 |
| WO | 2007/147559 | 12/2007 |
| WO | 2011/098583 | 8/2011 |
| WO | 2011/098584 | 8/2011 |
| WO | 2011/098587 | 8/2011 |
| WO | 2011/106906 | 9/2011 |

OTHER PUBLICATIONS

Wieghardt et al. Assembly and Strucutral Characterization of Binuclear u-Oxo-di-u-acetato Bridged Complexes of Manganese (III). J. Chem. Soc., Chem. Commun., 1985.*
Bouwman et al., "A study of new manganese complexes as potential driers for alkyd paints," J. Coat Technol. Res. 4 (4), 2007, pp. 491-503.
Oyman et al., "A promising environmentally-friendly manganese-based catalyst for alkyd emulsion coatings", Polymer, 45, 2004, pp. 7431-7436.
Wieghardt et al, "Synthesis, crystal structures, reactivity, and magnetochemistry of a series of binuclear complexes of manganese(II), -(III), and -(IV) of biological relevance", J. Am. Chem. Soc., 110, 1988, pp. 7398-7411.
Oyman et al., "Oxidative drying of alkyd paints catalysed by a dinuclear manganese complex (MnMeTACN)", Surface oatings International Part B: Coatings Transactions, vol. 88, B4, Dec. 2005, pp. 269-275.
Romakh et al., "Dinuclear manganese complexes containing 1,4-dimethyl-1,4,7-triazacyclononane ligands as well as carboxylato and oxo bridges", Inorganica Chimica Acta, 359, 2006, 1619-1626.

(Continued)

*Primary Examiner* — John Uselding
(74) *Attorney, Agent, or Firm* — McDonnell Boehnen Hulbert & Berghoff LLP

(57) ABSTRACT

A mixture for use as a drier for air-drying an auto-oxidizable resin composition, said mixture comprising : 1,4,7-trialkyl-1,4,7-triazacyclononane (L); and, a manganese salt having the general formula $Mn^{2+}[X]_n$, wherein anion X is selected from $PF_6^-$, $SbF_6^-$, $AsF_6^-$, $BF_4^-$, $B(C_6F_5)_4^-$, $Cl^-$, $Br^-$, $I^-$, $NO_3^-$, or $R_2COO^-$ in which case n=2, or the anion X is $SO_4^{2-}$ in which case n=1, and wherein $R_2$ is $C_1$-$C_{20}$ alkyl optionally substituted with heteroatoms, $C_6$-$C_{20}$ aryl optionally substituted with heteroatoms, or a polymeric residue; wherein the 1,4,7-trialkyl-1,4,7-triazacyclononane (L) is present in the mixture in an amount such that the molar ratio of L:Mn is at least 1.25:1 and more preferably at least 1.5:1.

18 Claims, No Drawings

(56) References Cited

OTHER PUBLICATIONS van Gorkum et al., "The autoxidation activity of new mixed-ligand manganese and iron complexes with tripodal ligands", Journal of Catalysis, 252, 2007, pp. 110-118.
International Search Report for International Application No. PCT/EP2012/075682, mailed Feb. 1, 2013.
European Search Report for EP Application No. 11194692.7, dated Mar. 16, 2012.
International Search Report for International Application No. PCT/EP2012/075681, mailed Feb. 1, 2013.
European Search Report for EP Application No. 11194686.9, dated completed on Mar. 7, 2012.
International Preliminary Report on Patentability for International Application No. PCT/EP2012/075681, completed on Apr. 3, 2014.
International Preliminary Report on Patentability for International Application No. PCT/EP2012/075681, completed on Nov. 21, 2013.
Bieleman, J. et al. "Chapter 7: Catalytically Active Additives" in Additives for Coatings, J. Bieleman (ed.) Wiley-VCH, 2000.
Oyman et al: "Catalytic activity of a dinuclear manganese complex (MnMeTACN) on the oxidation of ethyl linoleate", Applied Catalysis A: General, Elseyier Science, Amsterdam, NL, vol. 316, No. 2, pp. 191-196 (2006).
Swaraj Paul, "Surface Coatings", John Wiley and Sons; p. 89, 1985.
Tomalia et al., "Starburst Dendrimers: Molecular-Level Conotrl of Size, Shape, Surface Chemistry, Topology, and Flexibility from Atoms to Macroscopic Matter", Angewandte Chemie International (Edition English) 1990, vol. 29, pp. 138-175.
Encyclopaedia of Polymer Science and Engineering, Volume Index 1990, pp. 46-92.

\* cited by examiner

DRIER FOR AUTO-OXIDISABLE COATING COMPOSITIONS

REFERENCE TO RELATED APPLICATIONS

This application is the U.S. National Phase of PCT/ET2012/075681, filed on Dec. 17, 2012, and claims the benefit of EP Application No. 11194686.9, filed on Dec. 20, 2011.

FIELD OF THE INVENTION

The present invention is directed to a process for producing a Mn-based drier for use in an auto-oxidisable coating composition. The present invention is further directed to an auto-oxidisable coating composition comprising such drier, to the use of said composition and also to a substrate coated with said composition.

BACKGROUND TO THE INVENTION

Many items in our everyday life are provided with coatings which have a protective, signal, or decorative function. In recent years, considerable effort has been expended to develop coating compositions with enhanced sustainability, that is coatings characterized by a low content of volatile organic compounds (VOC)—and which indeed may be solvent-free—and/or coatings which contain resins and additives that are based on renewable resources. In the latter regard, it is now well-known to employ unsaturated-fatty acid functionalized resins in coating compositions because such resins are largely derivable from agricultural products and are also easily biodegraded.

The oxidative air drying of compositions containing fatty acid functionalized resins—such an alkyd resins—is due to autoxidation and cross-linking of the unsaturated oil/fatty acid component of the resin with simultaneous evaporation of the carrier solvent(s). Absorption of oxygen from the air causes peroxide formation and peroxide decomposition, which results in the generation of free radicals (Bieleman, J. et al. "Chapter 7: Catalytically Active Additives" in Additives for Coatings, J. Bieleman (ed.) Wiley-VCH (2000)). The free radicals initiate cross-linking and formation of higher molecular weight polymers, eventually leading to a solidified "air dried" film or coating.

The time for such a composition to dry depends on the concentration and type of unsaturated oil used to prepare the resin. Autoxidation and crosslinking of the unsaturated oil/fatty acid component can proceed unaided, but the time for drying is generally found to be unacceptably long for many practical purposes. The reactions are significantly accelerated by the presence of a metal-based drying catalyst, commonly referred to as a "drier". Whereas an alkyd coating may takes months to dry in the absence of a drying catalyst, in the presence of such a catalyst, drying can be accomplished within a few hours. The metal within the drying catalyst catalyzes autoxidation by forming a complex with both atmospheric oxygen and the double bonds of the unsaturated fatty acid groups within the composition.

Examples of known drier salts include polyvalent salts containing cobalt, calcium, copper, zinc, iron, zirconium, manganese, barium, zinc, strontium, lithium and potassium as the cation; and halides, nitrates, sulphates, carboxylates, such as acetates, ethylhexanoates, octanoates and naphthenates, or acetoacetonates as the anion.

The catalytic activity of the metal during decomposition of the (hydro)peroxide relies on the repeated transition of the metal ion from the lower to the higher oxidation state and back again, leading to reduction and oxidation of the hydroperoxides to catalyze and accelerate oxidation of the unsaturated oil component of the composition. For this reason, transition metals have more been commonly employed in such driers, as transition metals are capable of switching from a lower valence state to a higher valence state in a redox reaction with fatty acid peroxides present in the alkyd composition.

To date, driers based on cobalt have been most widely used because of their good performance at ambient temperature. However, because the cobalt salts will most likely be restricted in the near future because of regulatory issues, it is now desired to find alternative drier compounds that show at least comparable drying performance to that of cobalt driers and which can replace cobalt based driers completely in oxidatively air-drying coatings.

Driers based on non-cobalt metal salts, and in particular on manganese (Mn), are known from inter alia: EP 1 382 648 A1 (Van Gorkum et al); WO 2003/093384 (Oostveen et al.); E. Bouwman, R. van Gorkum, J. Coat. Technol. Res., 4, 491-503 (2007); and, R. van Gorkum et al., Journal of Catalysis 252 1 10-1 18 (2007). It is however considered that these prior art Mn-based driers: may not promote sufficient drying in a coating composition comprising an alkyd resin, especially in relation to tack free time; and, can yield coatings which suffers from severe dark yellowing.

Dinuclear manganese based complexes, $[Mn^{IV}_2(\mu-O)_3L_2](PF_6)_2$ (or MnMeTACN) wherein L is 1,4,7-trimethyl-1,4,7-triazacylononane have been disclosed as catalysts for the oxidative drying of alkyd paints (Oyman et al., Surface Coatings International Part B: Coatings Transactions, Vo. 88, B4, 231-315, December 2005). WO2011/098583, WO2011/098584 and WO2011/098587 (all DSM IP Assets B.V.) suggested that the alkyd coatings of Oyman did not dry with the desired efficiency and were prone to deleterious skin formation when stored inside a pot. Accordingly, these three citations have proposed modifications to the MnMeTACN catalyst wherein: the bridging oxygen ($\mu$-O) is optionally replaced by organic residues; and/or one or more methyl of 1,4,7-trimethyl-1,4,7-triacylcyclononane is optionally replaced by substituted or un-substituted $C_2$-$C_{20}$ alkyl groups or by substituted or un-substituted $C_6$-$C_{20}$ aryl groups; and/or where the $(PF_6)_2$ anion is optionally replaced by a carboxylate anion.

The crystal structure of several binuclear manganese complexes have been resolved, see for example Wieghart et al. J.A.C.S. 110(22):7398-7411 (1988) and Romakh et al. Inorg. Chim. Acta 359(5):1619-1626 (2006).

Despite these developments, there still remains a strong need in the art for alternative or better non-cobalt catalysts which can provide for fast drying which concomitantly provide for reduced yellowing of the coatings compositions which contain them. The present invention provides for a drier with a better cure speed-yellowing balance; i.e. either the cure speed can be enhanced in comparison with prior art non-cobalt driers, while keeping yellowing at about the same level, or the yellowing can be reduced with about the same cure speed. Preferably, the coating composition has good storage stability without the need to provide adjunct ingredients in larger amounts than commonly used, such as anti-skinning compounds.

STATEMENT OF THE INVENTION

In accordance with the present invention there is provided a drier for air-drying an auto-oxidizable resin composition, said drier comprising:

1,4,7-trialkyl-1,4,7-triazacyclononane (L) having the general structure

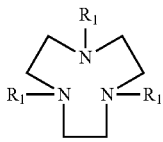

in which $R_1$ is $C_1$-$C_{20}$ alkyl optionally substituted with heteroatoms, or $C_6$-$C_{20}$ aryl optionally substituted with heteroatoms; and, a manganese salt having the general formula $Mn^{2+}[X]_n$, wherein anion X is selected from $PF_6^-$, $SbF_6^-$, $AsF_6^-$, $BF_4^-$, $B(C_6F_5)_4^-$, $Cl^-$, $Br^-$, $I^-$, $NO_3^-$, or $R_2COO^-$ in which case n=2, or the anion X is $SO_4^{2-}$ in which case n=1, and wherein $R_2$ is $C_1$-$C_{20}$ alkyl optionally substituted with heteroatoms, $C_6$-$C_{20}$ aryl optionally substituted with heteroatoms, or a polymeric residue;

wherein the 1,4,7-trialkyl-1,4,7-triazacyclononane (L) is present in an amount such that the molar ratio of L:Mn is at least 1.25:1 and preferably at least 1.5:1. The L:Mn molar ratio generally will be at most 20:1, preferably at most 15:1 and more preferably at most 12:1. An L:Mn molar ratio in the range from 2:1 to 10:1 or 5:1 may specifically be mentioned.

In accordance with a second aspect of the invention there is provided a mixture as drier, and a use therefor, for air-drying auto-oxidizable resin composition, said drier being obtainable by:

providing a manganese salt having the general formula $Mn^{2+}[X]_n$, wherein anion X is selected from $PF_6^-$, $SbF_6^-$, $AsF_6^-$, $BF_4^-$, $B(C_6F_5)_4^-$, $Cl^-$, $Br^-$, $I^-$, $NO_3^-$, or $R_2COO^-$ in which case n=2, or the anion X is $CO_4^{2-}$ in which case n=1, and wherein $R_2$ is $C_1$-$C_{20}$ alkyl optionally substituted with heteroatoms, $C_6$-$C_{20}$ aryl optionally substituted with heteroatoms, or a polymeric residue; and providing 1,4,7-trialkyl-1,4,7-triazacyclononane (L) wherein said 1,4,7-trialkyl-1,4,7-triazacyclononane (L) has the general structure

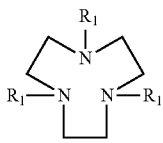

in which $R_1$ is $C_1$-$C_{20}$ alkyl optionally substituted with heteroatoms, or $C_6$-$C_{20}$ aryl optionally substituted with heteroatoms, optionally in the form of a solution; and, mixing said manganese salt with said 1,4,7-trialkyl-1,4,7-triazacyclononane;

wherein the 1,4,7-trialkyl-1,4,7-triazacyclononane (L) is provided in an amount such that the molar ratio of L:Mn is at least 1.25:1 and more preferably at least 1.5:1. The L:Mn molar ratio should be at most 20:1, preferably at most 15:1 and more preferably at most 12:1. An L:Mn molar ratio in the range from 2:1 to 10:1, or 5:1 may specifically be mentioned.

In accordance with a third aspect of the present invention there is provided an air-drying auto-oxidisable resin composition comprising:

a) a drier as defined above; and,
b) a polymer comprising unsaturated aliphatic groups.

The mixture of the present invention may also be provided by a tri-carboxylate-bridged binuclear manganese compound having two 1,4,7-trialkyl-1,4,7-triazacyclononane (L) ligands, and providing furthermore an excess of ligand (L) in appropriate amounts.

An advantage of the use of a manganese salt, and separately the ligand, is that costs can be lowered, as simple manganese salts can be used, and an unprocessed ligand. However, the advantageous effects of the present invention (a better balance of cure speed and yellowing) can be achieved irrespective of how the catalyst mixture is made.

There is further provided a coating composition comprising the auto-oxidizable resin composition as defined above. That auto-oxidizable resin composition may be used in paints, lacquers, inks and varnishes.

The invention also relates to a method of coating a substrate comprising the steps of: applying the coating composition onto said substrate; and, drying the coating composition in the presence of air. The composition once applied may be allowed to dry naturally at ambient temperature, but the drying process may be accelerated by heat at a temperature above ambient temperature.

There is further provided according to the invention a substrate carrying a pigmented or non-pigmented coating derived from a coating composition of the invention.

Definitions

Functionality is understood to be the average number of reactive groups of a certain type per molecule in the resin composition.

Polymer and resin are herein interchangeable terms.

As used herein, the term "oxidatively crosslinkable resin" includes any type of polymer which comprises unsaturated aliphatic groups, most typically unsaturated fatty acid residues. These unsaturated aliphatic groups or unsaturated fatty acid residues ensure the air drying properties but do not preclude the resin from comprising either saturated fatty acid residues or other functional groups. Generally, the unsaturated fatty acid residue is a carboxylic acid with a $C_{12}$ to $C_{30}$ carbon atom chain.

By semi-drying and drying fatty acids is meant fatty acids that have the same fatty acid composition as the oils they are derived from. The classification of the oils is based on the iodine number; for drying oil the iodine number is >140; for semi-drying oil the iodine number is ranging between 125 and 140, and for non-drying oil the iodine number is <125 ("Surface Coatings", by Swaraj Paul, John Wiley and Sons; p. 89).

Whilst the term "drier" is used herein for a metal salt which acts as a catalyst for the auto-oxidation reaction which is initiated on drying, it will be recognized that the terms "siccative", "desiccator" or "desiccative" are used as synonyms for drier in this art.

DETAILED DESCRIPTION OF THE INVENTION

The Drier 1,4,7-trialkyl-1,4,7-triazacyclononane (L) is a polydentate ligand having following general structure:

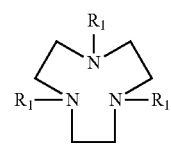

By polydentate is meant that the ligand contains multiple donor atoms available for coordination with manganese. Herein $R_1$ is $C_1$-$C_{20}$ alkyl optionally substituted with heteroatoms, or $C_6$-$C_{20}$ aryl optionally substituted with heteroatoms. Preferably $R_1$ is a $C_1$-$C_6$ alkyl, and more preferably $R_1$ is methyl such that specifically L is 1,4,7-trimethyl-1,4,7-triazacyclononane (TMTACN).

As defined above, the manganese salt from which the drier is derived has the general formula $Mn^{2+}[X]_n$, wherein anion X is selected from $PF_6^-$, $SbF_6^-$, $AsF_6^-$, $BF_4^-$, $B(C_6F_5)_4^-$, $Cl^-$, $Br^-$, $I^-$, $NO_3^-$, or $R_2COO^-$ in which case n=2, or the anion X is $SO_4^{2-}$ in which case n=1, and wherein $R_2$ is $C_1$-$C_{20}$ alkyl optionally substituted with heteroatoms, $C_5$-$C_{20}$ aryl optionally substituted with heteroatoms, or a polymeric residue. In a preferred embodiment, the drier is derived from a manganese carboxylate starting material, that is the anion is $R_2COO^-$. The preparation of transition metal salts of organic carboxylic acids is described inter alia in U.S. Pat. Nos. 4,633,001 (Cells) and U.S. Pat. No. 4,824,611 (Cells), the disclosures of which patents are herein incorporated by reference.

As described above $R_2$ may be $C_1$-$C_{20}$ alkyl optionally substituted with heteroatoms, $C_6$-$C_{20}$ aryl optionally substituted with heteroatoms, or a polymeric residue. Preferably $R_2$ is a $C_1$-$C_{20}$ alkyl group, wherein the alkyl group is straight or branched chain, saturated or unsaturated.

The aliphatic chain, including the branching group(s), in the acids of the manganese carboxylates may contain, or be substituted by, one or more atoms or groups which are inert under the conditions to which the carboxylates are subjected during processing and use. However, it is preferred that the aliphatic chain, including any branching group(s), is made up of carbon and hydrogen atoms only. Furthermore, the aliphatic chain, including any branching group(s), is preferably saturated.

Most preferably $R_2$ is a $C_4$-$C_{12}$, branched or straight chain, saturated aliphatic group. Specific examples of such carboxylate anions include: 4-methylpentanoate; 5-methylhexanoate; 2-ethylhexanoate; 3-ethylhexanoate; 3,5-dimethylhexanoate; 4,5-dimethylhexanoate; 3,4-dimethylhexanoate; 3,5,5-trimethylhexanoate; 4-methylheptanoate; 5-methylheptanoate; 6-methylheptanoate; 4,6-dimethylheptanoate; 7-methyloctanoate; 8-methylnonanoate; and, 9-methyldecanoate.

The drier may be prepared by mixing together the manganese salt and the ligand (L), one or both components being dispersed in an appropriate liquid medium. The ligand (L) may, for example, be dispersed in an organic solvent or a mixture thereof such as a 10% solution of trimethyl triazacyclonane in methoxy proponal (25%) and Shellsol D40 (65%). The ligand can be bought e.g. at Sigma-Alldrich. The ligand can also be used as such.

It is also envisaged that the drier may be formed in situ within the auto-oxidizable resin composition: a resin composition may be provided in which the manganese salt has been premixed; the ligand (L) is then mixed into the resin composition in an amount such that the molar ratio of L: Mn is greater than for example 1.2:1 or 2.5:1. This operation preferably occurs at room temperature.

It is furthermore envisaged that the drier is prepared by mixing a binuclear tricarboxybridge-bridged manganese-L complex and an additional amount of ligand in a coating composition.

These mixing processes involve physical mixing only. This physical process can thereby be distinguished from the chemical reaction conditions employed in K. Wieghardt et al. J. Am. Chem. Soc. 110, 7398-7411 (1998) which necessarily entail the use of perchloric acid and sodium hyperchlorate as reactants. Equally, a reaction with hydrogen peroxide as described in WO2011/106906 is not necessary. The present invention thereby provides for a simpler and more economical preparation of the drier. The drier may of course be manufactured by more elaborate methods, including for example chemical reactions.

Auto-Oxidizable Drying Resin Composition

In general, the oxidatively drying resin may be selected from alkyds, vinyl polymers, polyurethane resins, hyperbranched resins and mixtures thereof. The driers of the present invention are however considered to have particular utility for alkyd resins.

The number average molecular weight (Mn) of the oxidatively drying resin will generally be above 150, more usually higher than 1,000 and most typically higher than 5,000. For reasons of viscosity, the number average molecular weight (Mn) should generally be below 120,000, and more usually below 80,000.

The amount of unsaturated fatty acid residues in the oxidatively drying resin will depend on the polymer type. However, preferably the resin will comprise 20 wt %, more preferably 50 wt %, and most preferably 75 wt % of unsaturated fatty acid residues based on the total solids content of the resin.

Suitable drying unsaturated fatty acids, semi-drying fatty acids or mixture thereof, useful herein for providing the fatty acid groups in the resin include ethylenically unsaturated conjugated or non-conjugated $C_{12}$-$C_{24}$ carboxylic acids, such as myristoleic, palmitoleic, arachidonic, erucic, gadoleic, clupanadonic, oleic, ricinoleic, linoleic, linolenic, licanic, nisinic acid and eleostearic acids or mixture thereof, typically used in the form of mixtures of fatty acids derived from natural or synthetic oils. Suitable unsaturated fatty acids for providing fatty acid groups in the resin also include fatty acids derived from soybean oil, conjugated soybean oil, palm oil, linseed oil, tung oil, rapeseed oil, sunflower oil, conjugated sunflower oil, calendula oil, wood oil, tallow oil, (dehydrated) castor oil, safflower oil, tuna fish oil, coconut oil and dehydrated coconut oil, and combinations thereof. Whilst the main crosslinking mechanism of the composition of the present invention is by auto-oxidation, other crosslinking mechanisms may supplement this to give dual (or multiple) curing. Such secondary curing mechanisms may result from providing the unsaturated fatty acid functionalized polymer with additional functional groups—such as vinyl and carbonyl groups—that may provide further crosslinking, resulting in an even faster drying process of the coating composition. A person of ordinary skill in the art would be aware of a number of suitable, secondary crosslinking groups, which may of course be blocked or unblocked.

Such functional groups may be introduced into the auto-oxidisable resin using two general methods: i) by utilising monomers carrying the functional group in the polymerisation process used to form the auto-oxidisable resin; or ii) utilising monomers bearing selected reactive groups and which monomer is subsequently reacted with a compound carrying the functional group and also a reactive group of the type which will react with the selected reactive groups on the monomer to provide attachment of the functional group to the auto-oxidisable resin via covalent bonding. However, the presence of such groups should be selected such that the most significant part of any crosslinking reaction(s) only takes place after application of the resin to a substrate. This will avoid an "in-can" build-up of the molecular weight of the resins which may be problematic where the viscosity of the resin composition either becomes too high for application or becomes too high for effective leveling of the composition upon its application to a substrate or in the early stages of drying.

The auto-oxidative curing of the composition preferably takes place at ambient temperature, said temperature being herein from 0 to 40° C., preferably from 5 to 30° C. and most preferably from 10 to 25° C.

It is envisaged that the oxidatively drying resin may be used in combination with other resins, for example acrylic resins or polyurethanes. Any such mixed binder system should preferably comprise at least 60 wt. % of oxidatively drying resin, based on total resin.

Vinyl Polymers

By vinyl polymer herein is meant a polymer derived from ethylenically unsaturated monomers. (Poly)acrylates, also known as acrylics, are polymers derived from monomers which comprise alkyl esters of (meth) acrylic acid. The vinyl auto-oxidisable polymer is preferably prepared by free radical polymerization of vinyl monomers using a suitable initiator. Examples of vinyl monomers include: 1,3-butadiene, isoprene, styrene, a-methyl styrene, divinyl benzene, (meth)acrylonitrile, vinyl halides, vinylidene halides, vinyl ethers, vinyl esters, heterocyclic vinyl compounds, alkyl esters of mono-olefinically unsaturated dicarboxylic acids, and, in particular, $C_1$ to $C_{20}$ alkyl esters of (meth)acrylic acid. Of these, particularly preferred monomers include butyl(meth)acrylate, methyl(meth)acrylate methyl methacrylate, ethyl hexyl methacrylate, acrylonitrile, vinyl acetate and styrene.

Monomers which are useful for grafting the fatty acid onto the vinyl polymer to give fatty acid residues include hydroxylalkyl(meth)acrylates, such as hydroxyethyl(meth)acrylate, hydroxypropyl(meth)acrylate and epoxy functional vinyl monomers like glycidyl(meth)acrylate (GMA) or 3,4-epoxy-cyclohexylmethyl-acrylate. The incorporation of unsaturated fatty acid groups into vinyl polymers in also described inter alia in: U.S. Pat. No. 7,235,603; U.S. Pat. No. 6,599,972; U.S. Pat. No. 6,624,223; U.S. Pat. No. 3,988,273; and, WO2007/042684.

The vinyl monomers may optionally contain functional groups which can contribute to the crosslinking of the vinyl polymer(s) in the coating. Examples of such groups include maleic, epoxy, fumaric, acetoacetoxy, β-diketone, unsaturated fatty acid, acryloyl, methacrylol, styrenic, (meth)allyl groups, mercapto groups, keto or aldehyde groups (such as methylvinylketone, diacetoneacrylamide and (meth)acrolein).

Preferably the acid value of the vinyl polymer is from 0 to 60 mg KOH/g polymer, more preferably from 10 to 45 mg KOH/g and most preferably from 15 to 35 mg KOH/g polymer.

Hyperbranched Resins

WO 2007/147559, herein incorporated by reference, describes water soluble unsaturated fatty acid functional hyperbranched polyamides suitable for use in the present invention. The hyperbranched polyamide resin preferably has an amide (NH—C=0 or N—C=0) group content of <500 mmoles/100 g solid amide group containing resin, more preferably <400 mmoles/100 g and most preferably <300 mmoles/100 g solid amide group containing resin.

Hyperbranched polyesteramide resins, which may also find utility in the present invention, are polymers having branched structure with a high functionality obtained by the polycondensation of, for example, an anhydride with an alkanol-amine. Such resins and their methods of production are described in WO 99/16810, the disclosure of which is herein incorporated by reference. Broadly, the polyesteramide is prepared from three components, at least one anhydride, at least one alkanol-amine and at least one unsaturated fatty acid to impart the air-drying property. The alkanol-amine may be a monoalkanol-amine, a dialkanol-amine, a trialkanol-amine or a mixture thereof: to form highly branched structures, di- and trialkanol-amines should be used, in which regard diisopropanolamine (DIPA) may be mentioned as a preferred example.

Further hyperbranched polymers are described in: US Patent Application Publication No. 20090191412 (Van Benthem et al.); U.S. Pat. No. 5,731,095; EP 1440107 A1; Tomalia et al. Angewandte Chemie International (Edition English) 1990, Vol. 29, pp.138-175; and, Encyclopaedia of Polymer Science and Engineering, Volume Index 1990, pp. 46-92.

Polyurethane Resins

Polyurethane polymers generally contain urethane groups (—NHCOO—) or urea groups ($CO(NH)_2$) in their backbone structure. They are typically formed by the reaction of a polyisocyanate with a polyol and polyamines. Auto-oxidisable aqueous polyurethane dispersions are obtainable by reacting drying and/or semidrying oils with low molecular weight polyhydroxy compounds to yield compounds which contain on average at least one hydroxyl group and at least one residue of a fatty acid having at least one C=C double bond; these compounds are then reacted together with polyols, with compounds which have at least two isocyanate-reactive groups and at least one acid group or at least one group which, after neutralisation, forms a cationic group, like, for example, an ammonium group, with polyfunctional isocyanates. If desired, the prepolymer is then reacted with a compound which has an isocyanate-reactive group, followed by neutralizing the product formed with tertiary amines or mono-functional acids and transferring the utilized product to the aqueous phase, and subsequently, if desired, reacting any excess isocyanate groups still present by adding chain extenders, which have at least two primary or secondary amino groups or hydrazine groups per molecule.

Suitable isocyanates used as building blocks for the auto-oxidisable polyurethane resin are for example diisocyanates, such as 1,6-hexane diisocyanate, isophorone diisocyanate, toluene diisocyanate, diphenyl diisocyanate, and dicyclo-hexylmethane diisocyanate. Triisocyanates can also be used.

Alkyds

By alkyd resin herein is meant a resin prepared from the reaction of a polyhydric alcohol, a polybasic acid and an unsaturated oil or fatty acid to give an unsaturated fatty acid residue containing ester. The unsaturation in the ester polyol imparts latent cross-linkability upon auto-oxidation so that when a coating composition thereof is dried in the air, in conjunction with the drier salt, the coating material undergoes cross-linking (by auto-oxidation) and thereby improving its properties, for example its chemical resistance, hardness and/or durability.

The term alkyd resin is also meant to include such modified alkyds for specific applications, such as silicon-based alkyds, thixotropic alkyds and, most importantly, urethane-modified alkyds. As such, the alkyd resin may be based on pure polyester resin (not having urethane and/or amide groups), polyesteramide resin, urethanised polyester resin, urethanised polyesteramide resin and mixtures thereof.

Examples of suitable divalent polyol compounds are ethylene glycol, 1,3-propane diol, 1,6-hexane diol, 1,12- dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the compounds in question, such as ditrimethylol propane and di-, tri-, and tetrapentaerythritol. Optionally, use is made of compounds having 3-12 carbon atoms, e.g., glycerol, pentaerythritol and/or dipentaerythritol.

Alternatively or additionally, polycarboxylic acids can be used as building blocks for the oxidatively drying polyunsaturated condensation products. Examples of suitable polycarboxylic acids include phthalic acid, citric acid, fumaric acid, mesaconic acid, maleic acid, citraconic acid, isophthalic acid, terephthalic acid, 5-tert. butyl isophthalic acid, trimellitic acid, pyromellitic acid, succinic acid, adipic acid, 2,2,4-trimethyl adipic acid, azelaic acid, sebacic acid, dimerized fatty acids, cyclopentane-1,2-dicarboxylic acid, cyclohexane-1,2-dicarboxylic acid, 4-methylcyclohexane-1,2-dicarboxylic acid, tetrahydrophthalic acid, endomethylene-cyclohexane-1,2-dicarboxylic acid, butane-1,2,3,4-tetra-carboxylic acid, endoisopropylidene-cyclohexane-1,2-dicarboxylic acid, cyclo-hexane-1,2,4,5-tetracarboxylic acid, and butane-1,2,3,4-tetracarboxylic acid. If so desired, the carboxylic acids in question may be used as anhydrides or in the form of an ester, e.g., an ester of an alcohol having 1-4 carbon atoms.

At least a part of the alkyd resin is oxidatively crosslinkable as a result of the incorporation of unsaturated, aliphatic compounds as described above. Fatty acids containing conjugated double bonds, such as dehydrated castor oil fatty acid, wood oil fatty acid and/or calendula oil fatty acid, may be mentioned specifically. Fatty acids derived from soya oil are especially suitable. The unsaturated groups in the oxidatively drying polyunsaturated condensation product can be introduced by the fatty acids, but may, alternatively or additionally, be introduced by one or more of the polyols, carboxylic acids or anhydrides or other building blocks used, such as fatty mono-alcohols. The oxidatively drying polyunsaturated condensation product can for instance have pendant groups in an amount of more than 20%, e.g., more than 50%, or more than 65% by weight of the condensation product.

A specific example of a suitable alkyd is the condensation product of soya oil, phthalic anhydride, and pentaerythritol.

Optionally, the oxidatively drying polyunsaturated condensation product may comprise other building blocks, which can for example be derived from monocarboxylic acids such as pivalic acid, 2-ethylhexanoic acid, lauric acid, palmitic acid, stearic acid, 4-tert. butyl-benzoic acid, cyclopentane carboxylic acid, naphthenic acid, cyclohexane carboxylic acid, 2,4-dimethyl benzoic acid, 2-methyl benzoic acid, benzoic acid, 2,2-dimethylol propionic acid, tetrahydrobenzoic acid, and hydrogenated or non-hydrogenated abietic acid or its isomer. If so desired, the monocarboxylic acids in question may be used wholly or in part as triglyceride, e.g., as vegetable oil, in the preparation of the alkyd resin. If so desired, mixtures of two or more of such monocarboxylic acids or triglycerides may be employed.

Optionally, isocyanates may also be used as building blocks for the oxidatively drying polyunsaturated condensation product. Suitable isocyanates include diisocyanates, such as 1,6-hexane diisocyanate, isophorone diisocyanate, toluene diisocyanate, diphenyl diisocyanate, and dicyclohexylmethane diisocyanate, and triisocyanates.

The alkyd resins can be obtained by direct esterification of the constituent components, with the option of a portion of these components having been converted already into ester diols or polyester diols. Alternatively, the unsaturated fatty acids can be added in the form of a drying oil, such as sunflower oil, linseed oil, tuna fish oil, dehydrated castor oil, coconut oil, and dehydrated coconut oil. Transesterification with the polyols and, optionally, other building blocks will then give the final alkyd resin. This transesterification generally takes place at a temperature of from 115 to 250° C., optionally with solvents such as toluene and/or xylene also present. The reaction generally is carried out in the presence of a catalytic amount of a transesterification catalyst. Examples of suitable transesterification catalysts include acids, such as p-toluene sulphonic acid, a basic compound such as an amine, or compounds such as calcium oxide, zinc oxide, tetraisopropyl orthotitanate, dibutyl tin oxide, and triphenyl benzyl phosphonium chloride.

General processes for the preparation of alkyd polyesters are described in "Alkyd Resin Technology" by T. C. Patton, Publisher John Wiley & Sons Inc. (1962), the disclosure of which is incorporated herein by reference.

Alkyds are often characterized by their oil length. Oil length is defined as the weight percentage of fatty acid building blocks (calculated as their triglycerides) in the alkyd resin. Long oil lengths (55% or higher) result in improved oxidative drying, good substrate adhesion, excellent flow properties, good solubility in aliphatic solvents, and low viscosity, even with low solvent content. However, these alkyds show strong yellowing. Medium oil length alkyds (40-55%) also have good solubility but show a higher viscosity. Paint films made of medium oil length alkyds have better mechanical properties such as hardness and durability. Short oil length alkyds (less than 40%) require additional measures, such as the use of additional siccatives or amino resins, to obtain acceptable drying times. The catalyst according to the present invention can be used with alkyds of any oil length.

Preferably the alkyds described herein have a final polymer acid value of from 1 to 20 mg KOH/g resin, thereby making them suitable for the preparation of the Mn complex drier in situ with the alkyd resin.

Auto-Oxidizable Coating Composition

The auto-oxidisable coating composition of the invention may comprise a liquid medium, that is a low viscosity solvent such as water, organic (co-)solvents and mixtures thereof.

The composition of the present invention may be formulated as a solvent-borne coating composition. In this embodiment reactive diluents may be used to reduce the volatile organic content (VOC) below 300 g/l, a so-called high solids composition (solids content more than about 60%). However, it is also suitable for conventional coating compositions with a higher solvent content. In this context, VOC is determined in accordance with US standard ASTM D2369 (1 hr, 110° C.). Suitable solvents are, for instance, aromatic solvents such as toluene or xylene, as well as aliphatic solvents such as ethyl diglycol, ethyl glycol acetate, butyl glycol, butyl glycol acetate, butyl diglycol, butyl diglycol acetate, and methoxypropylene glycol acetate. Commercially available solvents are for instance Shellsol® D40, an aliphatic hydrocarbon solvent available from Shell, Dowanol® PMA from Dow, and Solvesso®-150, available from ExxonMobil.

Alternatively, the compositions according to the invention may be water-borne, can be used in an oxidatively drying water borne composition, optionally comprising co-solvents or humectants, such as glycols. Particularly useful for water borne compositions are reactive diluents with ionic or non-ionic stabilizing groups. These groups can, for example, be obtained by using diols or diesters containing carboxyl, sulfosuccinate or polyethylene glycol side groups.

As is known in the art, surfactants may be utilized to assist in the dispersion of the auto-oxidizable (alkyd) resin in water. Suitable surfactants include, but are not limited to, conventional anionic, cationic and/or non-ionic surfactants.

The liquid medium can also comprise reactive diluents, i.e. solvents which comprise functionalities which are able to react in the drying process with the unsaturated fatty acid residue comprising polymer. Thus, the reactive diluent is not co-reacted directly with the polymer, but participates to the drying process. Examples of such reactive diluents are the vinyl monomers described hereinabove.

In a preferred embodiment of the invention, the composition of the present invention is used in solvent borne coating compositions.

The composition according to the invention can be used as a clear varnish or may contain pigments. Pigments can ordinarily include opacifying pigments, such as titanium dioxide, zinc oxide, leaded zinc oxide, or tinting pigments, such as carbon black, yellow oxides, brown oxides, tan oxides, raw and burnt sienna or umber, chromium oxide green, phthalocyanine green, phthalonitrile blue, ultramarine blue, cadmium pigments or chromium pigments. Fillers can also be added, such as clay, silica, talc, or mica.

The coating composition can furthermore contain one or more additives such as secondary driers, UV stabilizers, co-solvents, dispersants, surfactants, inhibitors, fillers, anti-static agents, flame-retardant agents, lubricants, anti-foaming agents, extenders, plasticizers, anti-freezing agents, waxes, thickeners, or thixotropic agents.

Furthermore, the coating composition according to the invention may optionally comprise various anti-oxidants and anti-skinning agents such as methylethylketoxime, acetonoxime, butyraldoxime, dialkylhydroxylamine, cyclohexanoneoxime or mixtures thereof. Where present, the concentration of antioxidant or anti-skinning compound applied is preferably in a range of from 0.001 to 2 wt. %, by weight of the composition.

The total amount of primary manganese drier responsible for catalytic activity in the coating composition should not typically exceed 10 wt. %, based on the total resin weight, by weight of the composition, and preferably should be in the range from 0.001-3 wt %, and even more preferably between 0.01 to 3 wt. %, based on total resin weight. The amount of primary manganese drier is calculated on manganese plus multidentate ligand.

The primary manganese drier may be used together with one or more auxiliary driers and/or coordination driers in order to enhance the activity of the primary drier and/or the final characteristics of the dried coating, such as hardness and glossiness. Auxiliary driers interact with the primary drier. Coordination driers form coordination complexes with hydroxyl groups within the alkyd composition and thus help to stabilize the polymer network of the alkyd composition. The total amount of the auxiliary and/or co-ordination driers in the coating composition should not typically exceed 10 wt. %, based on the total resin weight, by weight of the composition, and preferably should be in the range from 0.01 to 3 wt. %, based on total resin weight.

Such auxiliary and/or coordination driers are typically polyvalent salts containing: barium, zirconium, calcium, bismuth, copper, zinc, iron, potassium, strontium neodymium, sodium or lithium as the cation; and, halides, nitrates, sulphates, carboxylates like acetates, ethylhexanoates, octanoates and naphthenates or acetoacetonates as the anion. Metallic soaps, which are soluble in the binder of the coating composition, may in particular be mentioned in this regard; examples of such soaps, which may be used individually or in combination, include strontium octoate, copper octoate, zirconium octoate, zinc octoate and calcium octoate.

Besides these driers, the coating composition may optionally comprise drying-accelerating complexing agents, for example, 2,2'-bipyridyl and 1,10-phenantroline. The complexing agents can be added in an amount of from 0 to 3 wt. %, preferably from 0.1 to 1.5 wt. %, based on the weight of the total resin.

Other ingredients that may be present in the coating composition depend on the envisaged application of the composition. Examples are antisettling agents, anti-sagging agents, de-airing agents, and the like. The sum of the amounts of the various additives will usually not exceed 5 wt. %, based on the total weight of the coating composition.

The coating compositions of the present invention can be pigmented or un-pigmented and may find utility as an adhesive, as primer, as a topcoat, as a high-gloss or matt coating, as a stain-resistant coating, a wood oil, a wall paint or a flooring paint. The term "paint" is not intended to be limited in this context and incorporates varnishes, enamels and lacquers for architectural or industrial use, indoors or outdoors.

Suitable substrates which may be coated with the auto-oxidisable coating composition of the invention include wood, wooden based substrates (e.g. MDF, chipboard), metal, stone, plastics and plastic films, natural and synthetic fibers, glass, ceramics, plaster, asphalt, concrete, leather, paper, foam, masonry and/or board. The application to such substrates may be effected by any conventional method, including brushing, dipping, flow coating, spraying, roller coating, pad coating, flexo printing, gravure printing, and ink-jet printing. For spraying, further dilution of the composition with a suitable solvent (for example acetone) may be required.

The present invention will now be further illustrated—but in no way limited—by reference to the following examples.
Experimental Drying times were determined by BK drying on a BK or Braive recorder (wet film thickness, 90 µm; ASTM D5895-96). After the application of the film on a glass strip (B.K. recorder: 69×2.5 cm; Braive recorder: 30.5×2.5 cm) a vertical blunt needle, pressed upon by a 5 g load, is placed into the freshly applied film and then dragged through the drying paint in a direction parallel to the edges of the strip.

The three stages of BK drying in the experiment were as follows: a) the (wet) paint flows together (leveling); b) the paint has begun to polymerize but a line left by the needle is visible or traceable (basis trace); and, c) drying has proceeded sufficiently that the film of paint is not displaced by the needle (the so-called "surface dry time"). In Table 6 and onwards, the drying time of steps a, b and c is given, at either 10 or 23° C. The drying time after 2 or 4 weeks storage of the paint was also measured. Generally, the drying times were shorter showing the same trend as shown in the tables below. Sometimes the drying time was retarded by storage.

To test the dust-free and tack-free drying stages of the coating compositions prepared in the Examples as described below, the composition was applied to a glass plate at a wet film thickness of 90 µm. Drying time tests were performed at regular time intervals at relative humidity (RH) levels of 50 (±5)%, temperatures of 23 (±2)° C. and an air flow of 0.1 m/s.

Dust-Free Time: the dust-free time was determined by dropping a piece of cotton wool (about 1 cm$^3$ i.e. 0.1 g) onto the drying film from a distance of 25 cm. If the piece of cotton wool could be immediately blown from the substrate by a person without leaving any wool or marks in or on the film, the film was considered to be dust-free.

Tack-Free Time: the tack-free time was determined by placing a piece of cotton wool (about 1 cm$^3$, 0.1 g) on the drying film and placing a metal plate (with a diameter of 2 cm) and then a weight of 1 kg onto the piece of cotton wool (for 10 seconds). If the piece of cotton wool could be removed from the substrate by hand without leaving any wool or marks in or on the film, the film was considered to be tack-free.

Yellowing was measured with a standard colorimeter, the results are given as b*value according to CIE-lab color space.

As used herein: "Mekoxime" is methyl ethyl ketoxime (available from Rockwood); TMTACN is used as liquid as such, without an additional solvent (assay: 95%); Co-Drier is a cobalt drier (10%, commercially available from Rockwood); Ca-Drier is a calcium drier (5%, commercially available from Rockwood); Zr-Drier is a zirconium drier (18%, commercially available from Rockwood); (Sr-Drier is a strontium drier (18%, commercially available from Rockwood); and, Mn-Drier is a manganese octoate drier (10%, commercially available from Rockwood).

EXAMPLES 1-2

A first, base formulation was prepared in accordance with the ingredients and proportions (parts by weight) shown in Table 1 below.

TABLE 1

Formulation A

| Parts By Weight | Ingredient |
| --- | --- |
| 63.0 | Polyurethane modified alkyd (oil length 63%; soybean oil; acid no < 2) |
| 22.0 | TiO$_2$ |
| 0.5 | Bentone |
| 1.5 | Butyl glycol |
| 10.5 | Aliphatic solvent (Shellsol D40) |
| 0.6 | Mekoxime |

Into this base formulation were mixed the following commercially available driers, and where appropriate the TMTACN ligand (amounts in parts by weight; the ration TMTACN:Mn is a molar ratio.

TABLE 2

| Coating Formulation | Formulation A | Ca-Drier | Co-Drier | Zr-Drier | Sr-Drier | Mn-Drier | TM-TACN | TM-TACN:Mn |
| --- | --- | --- | --- | --- | --- | --- | --- | --- |
| Comp A | 98.590 | 1.400 | 0.010 | 1.300 | | | | |
| Comp B | 98.199 | | | | 1.714 | 0.065 | 0.022 | 1:1 |
| Example 1 | 98.178 | | | | 1.714 | 0.065 | 0.043 | 2:1 |

The drying performance (drying time in minutes) of these coatings is shown in Table 3.

TABLE 3

| Coating Formulation | Dust-free Drying time | Tack-free Drying time |
| --- | --- | --- |
| A | 55 | 720 |
| B | 45 | 360 |
| 1 | 35 | 85 |

EXAMPLES 2-13 AND COMPARATIVE EXPERIMENTS C-N

A base coating composition was made, comprising the following components as given in Table 4:

TABLE 4

| name | Description | amount (wt %) |
| --- | --- | --- |
| Setal 270 SM-70 | long oil alkyd resin soybean oil based | 57.3 |
| Nuodex Ca 5 | Ca carboxylate in organic solvent | 2 |
| Nuodex Zr 18 | Zr carboxylate | 2 |
| EXKIN 2 | methyl ethyl ketoximine | 0.5 |
| Shellsol D40 | hydrotreated heavy naphtha petroleum | 13.6-14.3 |
| BORCHIGEN 911 | Amphoteric surfactants blend | 0.09 |
| Bentone SD-1 | organic derivative of a bentonite clay | 0.2 |
| TIOXIDE TR 92 | titanium dioxide, rutile | 23.7 |

To this paint formulation, primary driers were added. The components used are given in Table 5:

TABLE 5

| name | Description |
| --- | --- |
| Nuodex Mn 10 | Mn carboxylate |
| TMTACN | 1,4,7-trimethyl-1,4,7-triazacyclononane |
| DryCoat | Nuodex drycoat (binuclear Mn(II)-TMTACN complex with triple carboxylate bridge and 1 carboxylate anion |
| PF6 complex | Dragon catalyst from Catexel (binuclear Mn(IV)-TMTACN complex with triple oxygen bridge and 2 PF6 anions |
| Co-10 | Cobalt carboxylate |
| Bipy | 2,2'-bipyridine |
| DryPlus | A solution of 1,1,4,7,10,10-hexamethyltriethylenetetra-amine (30%) in a solvent |

EXPERIMENTS C-G AND EXAMPLES 2-13

In a first set of experiments the effect from increasing amounts of ligand relative to the amount of manganese is shown, results are summarized in Tables 6, 7 and 8; the BK drying times and yellowing are given from paints that were prepared about 24 hr before the curing; the yellowing is measured after 24 hr drying at 23° C. Table 6 summarizes results from a drying time of 3-3.5 hr at 10° C.; Table 7 4.5-5.25 hr at 10° C.; and Table 8 summarizes the results if a drying time of about 9.5 hr is chosen at 10° C. The amount of metal ions is given as mg per 100 g of paint composition (so, 1 mg is 0.001%)

TABLE 6

| Experiment | Mn | Ligand added | Mn (mg) | Equivalent ligand | BK drying 10° C. | BK drying 23° C. | Yellowing |
|---|---|---|---|---|---|---|---|
| Experim. C | Nuodex Mn 10 | TMTACN | 40 | 1 | 3.5 | 2.5 | 7.88 |
| Example 2 | Nuodex Mn 10 | TMTACN | 10 | 1.4 | 3.25 | 2.5 | 4.65 |
| Example 3 | Nuodex Mn 10 | TMTACN | 7.5 | 1.75 | 3.0 | 2.25 | 4.6 |
| Example 4 | Nuodex Mn 10 | TMTACN | 2.5 | 5 | 3.5 | 2.0 | 3.97 |
| Example 5 | Nuodex Mn 10 | TMTACN | 2 | 10 | 3.0 | 2.0 | 3.11 |
| Example 6 | Drycoat | TMTACN | 5 | 2 | 3.5 | 2.25 | 3.49 |

TABLE 7

| Experiment | Mn | Ligand added | Mn (mg) | Equiv ligand | BK drying 10° C. | BK drying 23° C. | Yellowing |
|---|---|---|---|---|---|---|---|
| Experim. D | Drycoat | — | 10 | 1 | 4.5 | 3.0 | 3.75 |
| Experim. E | Nuodex Mn 10 | TMTACN | 10 | 1 | 4.5 | 3.5 | 3.94 |
| Experim. F | Nuodex Mn 10 | TMTACN | 7.5 | 1 | 5.25 | 3.5 | 2.65 |
| Example 7 | Nuodex Mn 10 | TMTACN | 5 | 1.25 | 5.0 | 3.5 | 2.45 |
| Example 8 | Nuodex Mn 10 | TMTACN | 4 | 1.5 | 5.0 | 3.25 | 2.39 |
| Example 9 | Nuodex Mn 10 | TMTACN | 1 | 10 | 5.0 | 3.0 | 1.88 |
| Example 10 | Drycoat | TMTACN | 1.5 | 5 | 4.25 | 2.75 | 2.05 |

TABLE 8

| Experiment | Mn | Ligand added | Mn (mg) | Equiv ligand | BK drying 10° C. | BK drying 23° C. | Yellowing |
|---|---|---|---|---|---|---|---|
| Experim. G | Nuodex Mn 10 | TMTACN | 2.5 | 1 | 9.5 | 6.25 | 2.25 |
| Example 11 | Nuodex Mn 10 | TMTACN | 2 | 1.5 | 9.5 | 6.0 | 1.71 |
| Example 12 | Nuodex Mn 10 | TMTACN | 1.5 | 2 | 9.0 | 6.5 | 1.47 |
| Example 13 | Nuodex Mn 10 | TMTACN | 1 | 5 | 9.0 | 6.25 | 1.38 |

These results show that with an approximately equal drying time, the yellowing is substantially reduced by using excess ligand. In order to obtain comparable drying times, the amount of manganese obviously is lowered, when the amount of ligand is increased relative to the amount of manganese.

Experiments H-K

In the following experiments, it is shown that other type of amine-ligands than the trialkyltriaminedentate ligand do not perform well; the examples according the invention are ones from the tables 6-8.

TABLE 9

| Experiment | Mn | Ligand added | Mn (mg) | Equiv ligand | BK drying 10° C. | BK drying 23° C. | Yellowing |
|---|---|---|---|---|---|---|---|
| Ex 7 | Nuodex Mn 10 | TMTACN | 5 | 1.25 | 5.0 | 3.5 | 2.45 |
| Ex 9 | Nuodex Mn 10 | TMTACN | 1 | 10 | 5.0 | 3.0 | 1.88 |
| Exp H | Nuodex Mn 10 | TMTACN DryPlus | 5 | 1 and 9 DryPlus | 4.75 | 3.75 | 4.67 |
| Ex 12 | Nuodex Mn 10 | TMTACN | 1.5 | 2 | 9.0 | 6.5 | 1.47 |
| Exp I | Nuodex Mn 10 | TMTACN DryPlus | 1.5 | 1 and 9 DryPLus | 10.5 | 7 | 1.8 |
| Exp J | Nuodex Mn 10 | TMTACN Bipy | 1.5 | 1 and 1 Bipy | 11.25 | 8 | 1.68 |

In the following experiments, the drier system according the present invention is compared with a conventional cobalt drier; the example according the invention is one from the tables 6-8.

TABLE 10

| Experiment | Mn | Ligand added | Mn (mg) | Equiv ligand | BK drying 10° C. | BK drying 23° C. | Yellowing |
|---|---|---|---|---|---|---|---|
| Ex 5 | Nuodex M 10 | TMTACN | 2 | 10 | 3.0 | 2.0 | 3.11 |
| Exp K | Cobalt-10 | Not applicable | 30 mg Co | | 3.5 | 2.75 | 3.08 |

From a comparison of the results in Table 10, it is clear that Example 5 gives a performance substantially equal to conventional cobalt drier at a substantially lower amount of transition metal ions.

EXAMPLES 14-15 AND EXPERIMENT L

A water borne paint base was prepared with the components of Table 11

TABLE 11

| COMPONENT | SUPPLIER | DESCRIPTION | WT % |
|---|---|---|---|
| Uradil AZ 554-Z-50 | DSM-resins | Alkyd resin, chain stopped waterborne | 45.0 |
| Demiwater | | | 23.9 |
| Aquaflow NLS 200 | Hercules | Hydrophobically modified poly-ether solution (HM-PAPE) | 1.7 |
| Byk 024 | Byk chemie | Polysiloxanes and hydrophobic silica | 0.1 |
| Disperbyk 190 | Byk chemie | High molecular weight block co-polymer solution | 2.0 |
| Kronos 2310 | Kronos | Titanium dioxide, rutile | 20.2 |
| Propylene glycol | | 1,2-propanediol | 1.5 |
| Byk 348 | Byk chemie | Polydimethyl siloxane polyether modified | 1.0 |
| Aquaflow NHS 300 | Hercules | Hydrophobically modified poly-ether solution (HM-PAPE) | 2.6 |
| DPM Glycol Ether | Dow Chemical Company | (2- methoxymethylethoxy)propanol | 2.0 |

To this paint formulation, manganese-carboxylate and TMTACN were added, as shown in Table 12.

TABLE 12

| Experiment | Mn (mg) | equiv Ligand | BK drying 10° C. | BK drying 23° C. | Yellowing | Haze after 24 hr | Gloss 20° after 24 hr | König hardness (24 hr) |
|---|---|---|---|---|---|---|---|---|
| Exp. L | 5 | 1 | 4.75 | 3.88 | 3.93 | 111 | 59 | 4 |
| Examp. 14 | 1.5 | 5 | 4.25 | 2.00 | 3.13 | 82 | 61 | 4 |
| Examp. 15 | 1 | 10 | 4.75 | 2.13 | 2.87 | 76 | 68 | 5 |

These experiments show that also in water borne paints the effect of the invention is observed.

Various changes and modifications to the presently preferred embodiments described herein will be apparent to those skilled in the art. Such changes and modifications can be made without departing from the scope of the present invention and without diminishing its attendant advantages. It is therefore intended that such changes and modifications are covered by the appended claims.

The invention claimed is:

1. An air-drying auto-oxidizable resin composition comprising:
   a) a drier comprising:
      i) a manganese salt comprising $Mn^{2+}$ and anion X, wherein X has the formula $R_2COO—$, wherein $R_2$ is $C_1$-$C_{20}$ alkyl optionally substituted with heteroatoms, $C_6$-$C_{20}$ aryl optionally substituted with heteroatoms, or a polymeric residue; and
      ii) 1,4,7-trisubstituted-1,4,7-triazacyclononane (L) wherein said 1,4,7-trisubstituted-1,4,7-triazacyclononane (L) has the general structure

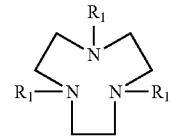

wherein $R_1$ is $C_1$-$C_{20}$ alkyl optionally substituted with heteroatoms, or $C_6$-$C_{20}$ aryl optionally substituted with heteroatoms;
   wherein the 1,4,7-trisubstituted-1,4,7-triazacyclononane (L) and manganese salt (Mn) are in a molar ratio of L:Mn of at least 1.25:1; and,
   b) a polymer comprising unsaturated aliphatic groups.

2. The resin composition according to claim 1, wherein $R_1$ is a $C_1$-$C_6$ alkyl.

3. The resin composition according to claim 1, wherein $R_2$ is a $C_1$-$C_{20}$ alkyl group, wherein the alkyl group is a straight or branched chain, saturated or unsaturated.

4. The resin composition according to claim 1, wherein the molar ratio of L:Mn is lower than 20:1.

5. The resin composition according to claim 1, wherein the polymer comprising unsaturated aliphatic groups is selected from the group consisting of alkyds, vinyl polymers, polyurethane resins, hyperbranched resins and mixtures thereof.

6. The resin composition according to claim 5, wherein the polymer comprises an alkyd.

7. A coating composition comprising the resin composition according to claim 1.

8. The coating composition according to claim 7, further comprising one or more auxiliary and/or coordination driers in an amount not exceeding 10 wt %.

9. A method of coating a substrate comprising the steps of:
applying the coating composition according to claim 8 onto the substrate; and
drying the coating composition in the presence of air.

10. The method according to claim 9, wherein the drying occurs at ambient temperature.

11. A coated substrate comprising a substrate coated with the coating composition according to claim 7.

12. A liquid comprising the resin composition according to claim 1, wherein the liquid is selected from the group consisting of a paint, an adhesive, a lacquer, an ink and a varnish.

13. A method of drying comprising air-drying the resin composition according to claim 1.

14. The method according to claim 13, wherein the 1,4,7-trisubstituted-1,4,7-triazacyclononane (L) is present in an amount such that the molar ratio of L:Mn is at least 1.5:1.

15. The resin composition according to claim 1, wherein $R_1$ is a methyl.

16. The resin composition according to claim 1, wherein $R_2$ is a $C_4$-$C_{12}$ alkyl group, wherein the alkyl group is a straight or branched chain, saturated or unsaturated.

17. The resin composition according to claim 1, wherein the molar ratio of L:Mn is lower than 12:1.

18. The air-drying auto-oxidizable resin composition according to claim 1, wherein the molar ratio of L:Mn is at least 1.5:1.

\* \* \* \* \*